Aug. 21, 1962 N. E. WEEKS, JR 3,049,873
EXHAUST NOZZLE HAVING A FLOW AREA OF VARIABLE
CONVERGENCY AND DIVERGENCY
Filed Feb. 4, 1958 2 Sheets-Sheet 1
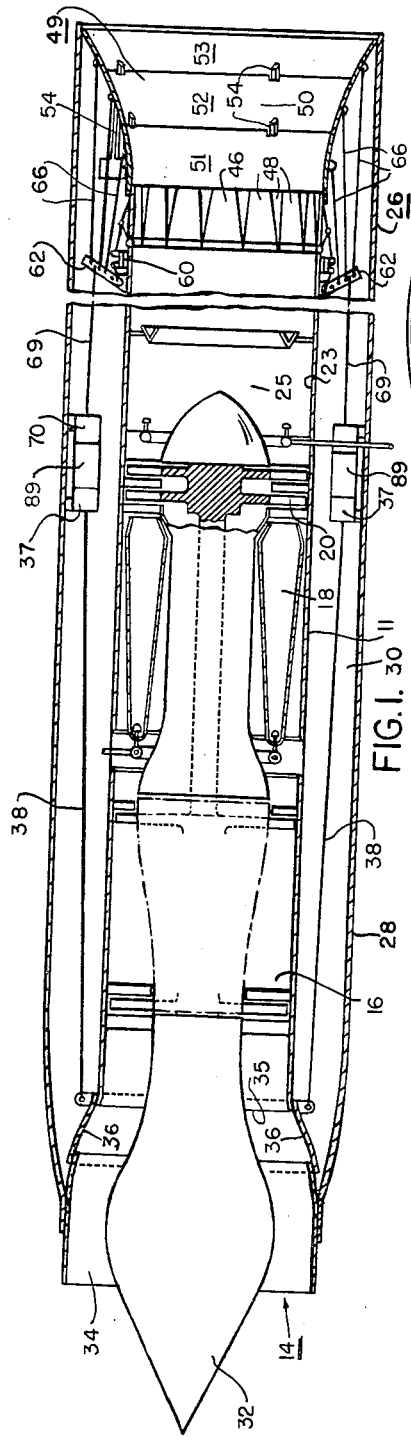
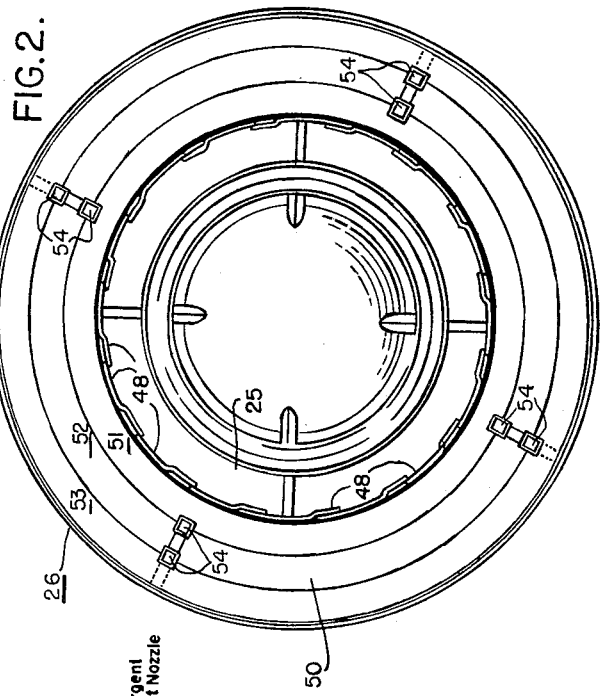
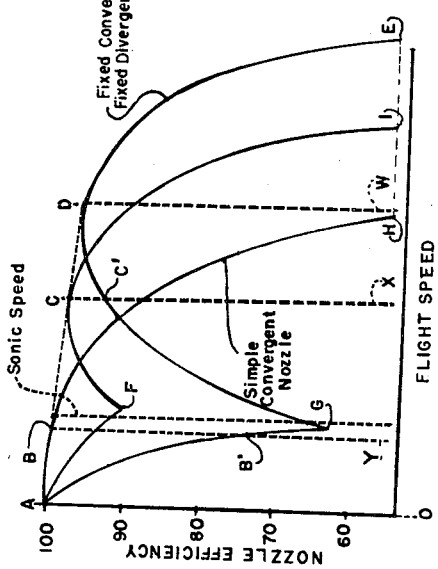
INVENTOR
NORMAN E. WEEKS JR.
BY INVENTOR
NORMAN E. WEEKS JR.
BY
Frank Critians Jr.

United States Patent Office 3,049,873
Patented Aug. 21, 1962

3,049,873
EXHAUST NOZZLE HAVING A FLOW AREA OF VARIABLE CONVERGENCY AND DIVERGENCY
Norman E. Weeks, Jr., Kansas City, Kans., assignor to Westinghouse Electric Corporation, East Pittsburgh, Pa., a corporation of Pennsylvania
Filed Feb. 4, 1958, Ser. No. 713,123
2 Claims. (Cl. 60—35.6)

This invention relates to aviation jet propulsion engines, more particularly to aviation jet propulsion engines employed for propelling aircraft at variable subsonic and supersonic speeds, and has for an object to provide therefor an improved exhaust nozzle structure of the convergent-divergent type which is highly efficient throughout the speed range of the aircraft.

For operation at variable flight speeds, it is desirable to have an exhaust nozzle structure in which the effective convergency and divergency of the flow area may be varied as the flight speed varies, in order to maintain the efficiency of the nozzle. This invention accomplishes the foregoing by physically varying the wall structure defining the nozzle structure and utilizing a flow of air to assist in defining the flow area through which the exhaust gases flow during certain operating conditions.

One embodiment of the present invention provides, in an aviation jet propulsion engine, a variable area exhaust nozzle structure for the passage of fluid therethrough, comprising an annular array of overlapping leaves and a divergent duct defined by a plurality of annular louvers. Means are provided for moving the leaves jointly and radially inwardly to form a convergent passage and for axially displacing the louvers relative to each other during certain operating conditions. In so doing, annular passages are formed between the leaves and one of the louvers and between adjacent louvers, that communicate with a source of air. The air that flows through these passages during certain operating conditions defines a flow path through which the exhaust gases flow. This air establishes an envelope or boundary which defines the flow path for the exhaust gases and prevents them from expanding to the confines of the divergent duct, thus restricting the expansion of the gases. Means are provided for regulating the flow of air through the passages and varying the cross-sectional area of this flow path and thereby controlling the expansion of the gases through the exhaust nozzle.

The foregoing and other objects are effected by the invention as will be apparent from the following description and claims taken in connection with the accompanying drawings, forming a part of this application, in which:

FIG. 1 is an axial sectional view of an aviation jet propulsion engine incorporating the present invention in the exhaust nozzle structure thereof, but omititng certain members in the interest of clarity;

FIG. 2 is a right hand end view of the apparatus illustrated in FIG. 1, including the members omitted in FIG. 1;

FIG. 6 is a graph showing the relationship between nozzle efficiency and flight speed of the aircraft for exhaust nozzles of the prior art and for the exhaust nozzle structure of the present invention.

Figure 3:
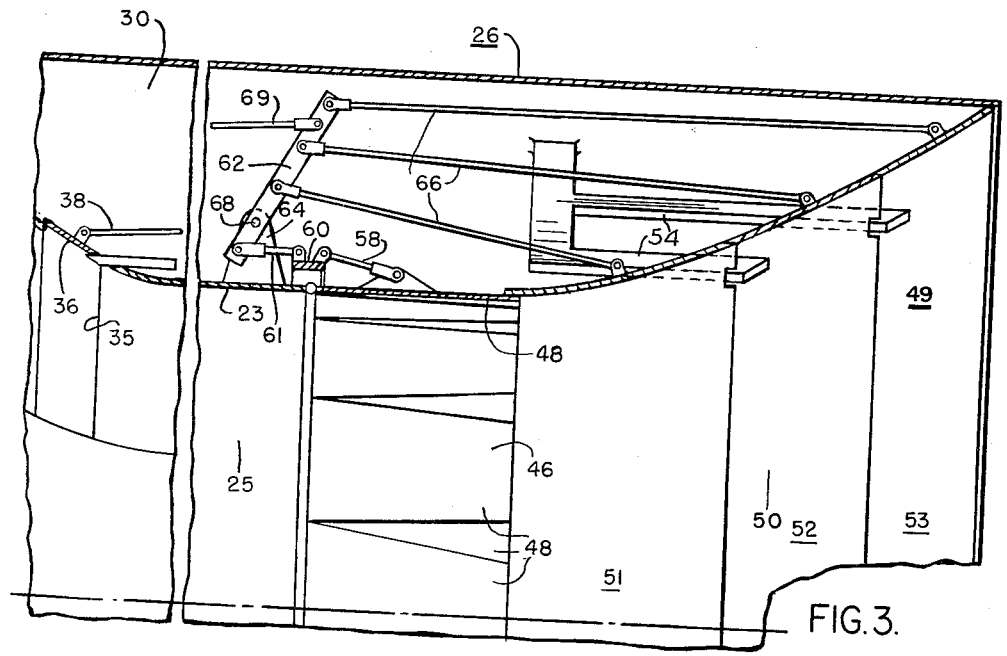
FIGS. 3, 4 and 5 are enlarged fragmentary axial sectional views of the exhaust nozzle structure showing various operating positions.

In the above drawing views, only the numerals identifying passageways and openings have dots provided on the ends of the lead lines to readily distinguish such passageways and openings from the structural elements. All other lead lines, namely the lead lines from reference numerals to structural elements have no dots at the ends.

Referring to FIG. 1, there is illustrated an aviation jet propulsion engine comprising a cylindrical housing 11 in which is disposed an inlet air nozzle structure 14 and a compressor 16 communicating with a combustion structure 18. Further, within the housing 11 is disposed a turbine 20 which communicates with the combustion structure 18. The right hand end portion of the housing 11, as viewed in FIG. 1, forms an elongated duct 23 defining an exhaust gas passage 25 in which are disposed suitable fuel injecting structure and flameholding structure for afterburning, as is well known in the art. Exhaust gases are discharged to the atmosphere through the passage 25 and an exhaust nozzle structure 26. The latter provides a main passage for the flow of gases which propel the aircraft in a well-known manner. The housing 11 is encompassed by a tubular shell 28 and together therewith defines an elongated annular bypass passage 30.

The inlet air nozzle structure 14 includes an axially extending spike member 32 projecting beyond the housing 11 and defining therewith an annular passage 34 admitting air to the compressor 16. Upstream of the compressor 16, in a portion of the housing 11, there is formed an annular opening 35, providing a communication between the passage 34 and the annular bypass passage 30 and varied by an axially translatable annular door 36. The door 36 is operatively connected to suitable reciprocable actuators 37 by rods 38.

Figure 4:
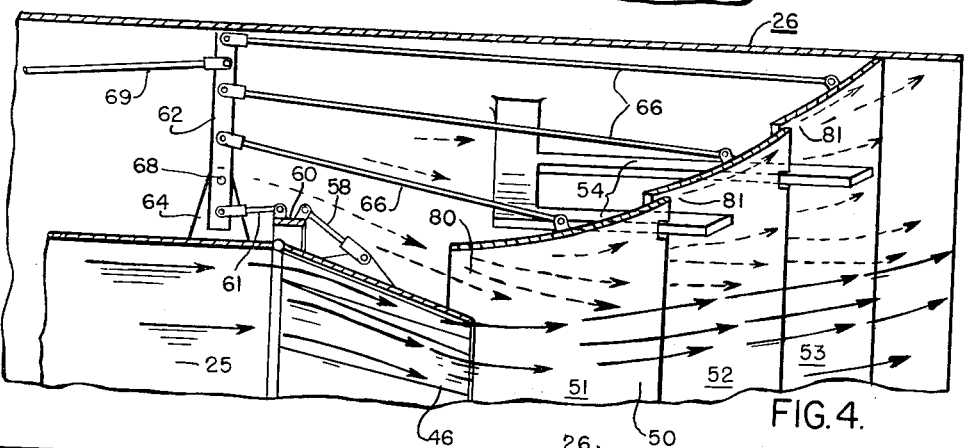
Figure 5:
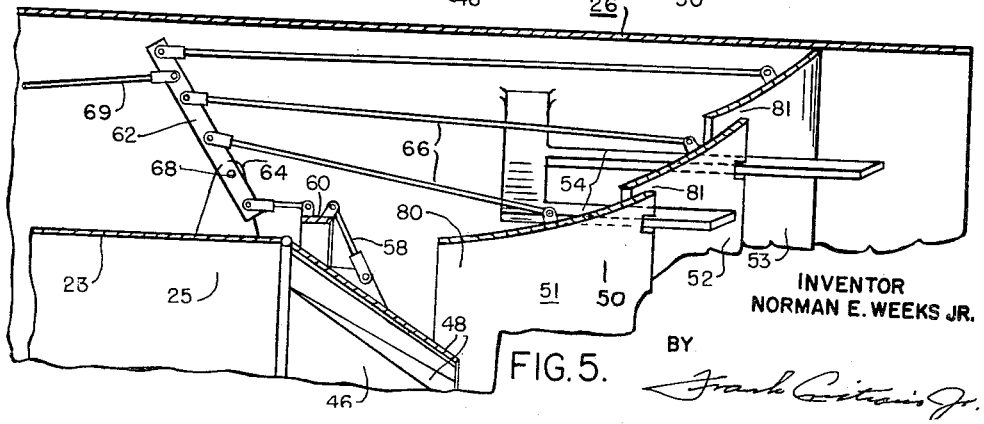

As best illustrated in FIGS. 3, 4 and 5, the passage 25 is in communication with a passage 46 defined by an annular array of overlapping leaves 48 which are suitably pivotably connected to the downstream portion of the duct 23 and modify the outlet area of the passage 46. Each of the leaves 48 is provided with a link 58 which is pivoted at one end to the leaf and at the other end to an annular common actuator or unison ring 60. Downstream of the passage 46, there is disposed a tubular divergent wall or duct structure 49 defining a divergent passage 50 in communication with the passage 46. The duct 49 comprises three graduated concentric sections, rings or louvers 51, 52 and 53 mounted on axially extending tracks 54. Each of these louvers is of generally frusto-conical shape, but having a curvature to impart a smoothly divergent form to the duct 49. The louvers 51, 52 and 53 are concentrically aligned with the axis of the annular array of leaves 48.

FIGS. 1 and 3 best illustrate a mechanism for jointly actuating the leaves 48 and louvers 51, 52 and 53. It is to be understood that a plurality of such mechanisms may be disposed about the periphery of the nozzle structure, but for the sake of clarity only one is illustrated and described in detail. Referring to FIG. 3, this mechanism is disposed in the annular bypass passage 30 and comprises a link 61 pivotably connected at one end to the unison ring 60 and at the other end to an arm 62. Likewise, each of the louvers 51, 52 and 53 is pivotably connected by a link 66 to the arm 62. The arm 62 is pivotably supported by a pivot member 68 on a rigid member 64 secured to the duct 23. The link 61 is located radially inward of the pivot member 68, and the links 66 are located radially outward thereof. As illustrated by FIG. 1, the arm 62 is operatively connected to a suitable reciprocable actuator 70 by an actuating rod 69.

At the maximum supersonic aircraft speed, the nozzle structure 26 is in the position illustrated in FIGS. 1 and 3, and the exhaust gases are allowed to expand a maximum amount. In this position, a substantially smooth wall surface is presented to the gas flow by the nozzle structure 26, since a portion of the leaves 48 are extended radially outward to the outermost position so that they overlap a portion of the louver 51, and the louvers 51, 52 and 53 are moved to the right the maximum amount until the louvers 51 and 53 are in substantial abutment with louvers 52. In addition, the opening 35 is fully closed by the door 36. This is the fully closed position of the nozzle structure and there is substantially no communication between the bypass passage 30 and the passage 50.

During reduced speed, it is desirable to reduce the nozzle area available to the gases passing through the exhaust nozzle, as illustrated in FIGS. 4 and 5. This reduction in nozzle area is accomplished by converging or moving the leaves 48 radially inwardly, so as to reduce the cross-sectional area of passage 46. The leaves 48 are moved radially inwardly by movement of the actuator rod 69 to the left by the actuator 70, as viewed in FIG. 1, and concomitant counterclockwise movement of the arm 62, as viewed in FIGS. 3, 4 and 5. Jointly with the radially inward movement of the leaves 48, the links 66 move the louvers 51, 52 and 53 axially forward (or to the left as viewed in FIGS. 4 and 5) and relative to each other and the leaves 48 in a manner to establish annular passages 80 and 81, illustrated in FIGS. 4 and 5, downstream of the throat or area of smallest cross section of the passage 46. The annular passage 80 generally encompasses the leaves 48 and is, in turn, encompassed by the louver 51. The annular passages 81 are formed between louvers 51 and 52 and between louvers 52 and 53.

The links 66 are positioned radially along the arm 62 in such a manner that the louver 53 is translated farther than the louvers 51 and 52. This larger movement of louver 53, in addition to its larger diameter as compared to louver 52, makes the outermost passage 81 (the one between louvers 52 and 53) the larger of the two passages 81.

In the fully open position for subsonic speeds (a condition of substantially reduced aircraft speed) illustrated in FIG. 5, the leaves 48 are disposed in the radially innermost position and the nozzle now functions substantially the same as a nozzle of the type having only a convergent portion. That is, in this position, the door 36 (FIG. 1) is in the fully open position and the louvers 51, 52 and 53 are moved to the left, as viewed in FIG. 5, making the passages 80 and 81 of maximum size. Hence, the maximum amount of air flows through the passages 80 and 81 from passage 30 to passage 50. However, since the nozzle leaves 48 are in the innermost position, the gas flowing through the nozzle is substantially controlled by the leaves.

During supersonic speeds below the maximum speed the leaves 48 and the louvers 51, 52 and 53 may be moved to any intermediate position between the fully open position (FIG. 5) and the fully closed position (FIG. 3), and FIG. 4 illustrates an intermediate position (corresponding to an intermediate supersonic speed) in which the louvers are moved to the left and the leaves radially inward, as viewed in FIG. 4, an intermediate amount so that the passages 80 and 81 are of sizes intermediate those attained in the fully open and the fully closed positions. In this position the opening 35 is partially opened by the door 36.

Jointly with movement of the actuator 70, the actuator 37 (FIG. 1) and rod 38 control the door 36. The door 36 is moved by the rod 38 in the direction to uncover the opening 35 when the leaves 48 and louvers 51, 52 and 53 are moved in the direction to open the passages 80 and 81 and in the opposite direction when the leaves and louvers are moved in the direction to close the passages 80 and 81. Movement of the door 36 is correlated to and maintained proportional with the action of the exhaust nozzle structure 26 by a suitable mechanism 89 which controls the joint action of actuators 70 and 37. Hence, the size of passages 80 and 81 is correlated to the movement of the door 36. Thus, air is admitted to the bypass passage 30 and flows through the passages 80 and 81 in the required amount.

The streams of air, indicated in FIG. 4 by dotted arrows, establish an envelope or boundary of air which defines a flow path for the exhaust gases, indicated by solid arrows, through the passage 50 and prevent or restrict the exhaust gases from expanding to the confines of the divergent duct 49 defined by the louvers 51, 52 and 53. In this manner the exhaust gases are prevented from overexpanding during certain phases of operation. In the foregoing manner, a variable flow of air is established adjacent the louvers and leaves which varies the divergency of the passage 50 and restricts the expansion of the gases flowing therethrough. By utilizing this air to modulate the cross-sectional area of the passage 50 available to the exhaust gases, the efficiency of the exhaust nozzle is maintained at relatively high values for a wider range of speed of the aircraft than theretofore attainable with previously employed exhaust nozzle structures.

The curves shown in FIG. 6 illustrate the nozzle efficiencies of heretofore proposed nozzles and of the nozzle of the present invention for various flight speeds. In FIG. 6, the abscissas correspond to various flight speeds and the ordinates to the nozzle efficiencies in percent.

The performance of a nozzle of the simple convergent type is illustrated by the curve passing through the points ABH. This type of nozzle is utilized primarily at subsonic speeds because the efficiency of such a nozzle decreases rapidly as the speed increases above sonic. The performance of a nozzle having fixed convergent and fixed divergent portions is illustrated by the curve passing through the points AGDE. Such a nozzle has a high efficiency for a limited range of supersonic speeds but as the speed departs from this limited range the efficiency of the nozzle decreases rapidly.

The present invention provides a device for attaining better nozzle performance than that achieved by a simple convergent nozzle at flight speeds greater than sonic speed Y (corresponding to point B) in the area bounded by the curves passing through the points BH and DE and the dotted lines passing through the points BCD and HIE, and better nozzle performance than that achieved by a nozzle having fixed convergent and fixed divergent portions for flight speeds between O and W (the latter corresponding to point D) in the generally triangularly shaped area bounded by the curves passing through the points AB'G and GC'D and the approximately straight line comprising the solid line passing through the points AB and the dotted line passing through the points BCD. The foregoing is accomplished by constructing a nozzle in accordance with the present invention which in the fully closed positions (FIG. 3) has the ratio of cross-sectional area at the outlet of the passage 50, the exit area, to the throat area of the passage 46, equal to a nozzle having fixed convergent and fixed divergent portions operating at the same conditions of gas flow, the performance of both being illustrated by the curve passing through the points AGDE. As the flight speed decreases from the speed W, the louvers 51, 52 and 53 are opened and the leaves 48 are moved radially inwardly to an intermediate position, introducing air into the nozzle through passages 80 and 81. This is the intermediate position of the nozzle (FIG. 4) and its performance is illustrated by the curve passing through the points AFCI. It is evident that the efficiency of the nozzle at a speed corresponding to X has been improved from C' to C by utilizing the present invention.

Still referring to FIG. 6, at subsonic speed Y or below, the nozzle of the present invention is in the fully open position (FIG. 5). A curve representing the performance of the nozzle in this position is substantially the same as the curve passing through the points ABH corresponding to a simple convergent nozzle. It is evident that the nozzle efficiency has been increased from B', corresponding to a nozzle having fixed convergent and fixed divergent positions, to B, corresponding to the nozzle of the present invention.

Thus, it is seen that a nozzle has been provided which results in the desirable characteristic of producing high efficiencies for subsonic speeds (up to sonic speed Y), a characteristic of a simple convergent nozzle, and in high efficiencies for various supersonic speeds, a characteristic of nozzles having fixed convergent and fixed divergent portions corresponding to the various speeds.

From the foregoing, it is seen that an exhaust nozzle structure of the convergent-divergent type has been provided which is simple in construction and which may be readily adjusted between various positions with changes in aircraft operating conditions to maintain optimum efficiency throughout the flight range of a jet propulsion engine.

While the invention has been shown in but one form, it will be obvious to those skilled in the art that it is not so limited, but is susceptible of various changes and modifications without departing from the spirit thereof.

What is claimed:

1. In an aircraft engine having a duct providing an exhaust gas outlet, a structure for controlling the area of said outlet comprising an annular array of movable leaves, means for moving said leaves radially inwardly so that a convergent duct is formed by said leaves, a plurality of graduated ring members having a generally frusto-conical shape and disposed adjacent the downstream portion of said leaves, said rings being axially translatable to a first position in which they are in mutual annular abutment and jointly define a divergent exhaust gas passage, one of said ring members defining jointly with said leaves a first annular passage for the flow of air therethrough when said leaves are moved inwardly, means for jointly and axially translating said ring members relative to each other in upstream direction relative to gas flow through said outlet to provide additional annular passages between said ring members, means for correlating the movement of said leaves and ring members to each other, and means for supplying pressurized air to said first annular passage and said additional annular passages.

2. In an aviation jet engine having a duct providing an exhaust gas passageway, a structure for controlling gas flow through said passageway and comprising an annular array of movable leaves, said leaves defining a throat section, means for operating said leaves in unison to impart a convergent shape to said throat section of a cross-sectional area smaller than that of said duct, a plurality of ring members disposed downstream of said leaves, said ring members being adapted to abut each other and defining a divergent passage of larger cross-sectional area than that of said duct and in fluid communication with said exhaust gas passage, one of said ring members and said leaves jointly defining a first annular passage when said leaves are moved to a convergent position, said rings being of substantially frusto-conical shape, means for axially translating said ring members jointly in upstream direction to provide second annular passages therebetween, said ring members being translatable axially in varying degrees to modify the cross-sectional area of said first and second passages, means for coordinating the movement of said leaves and said ring members, means for conducting pressurized air to said ring members, and means for regulating the rate of air flow, said regulating means being effective to increase the rate of air flow as said ring members are translated in upstream direction and said leaves are moved in converging direction.

References Cited in the file of this patent

UNITED STATES PATENTS

| 1,493,157 | Melot | May 6, 1924 |
| 2,487,588 | Price | Nov. 8, 1949 |
| 2,770,944 | Jordan | Nov. 20, 1956 |
| 2,780,056 | Colley | Feb. 5, 1957 |

FOREIGN PATENTS

| 654,344 | Great Britain | June 13, 1951 |
| 820,059 | Great Britain | Sept. 16, 1959 |